Figure 1:
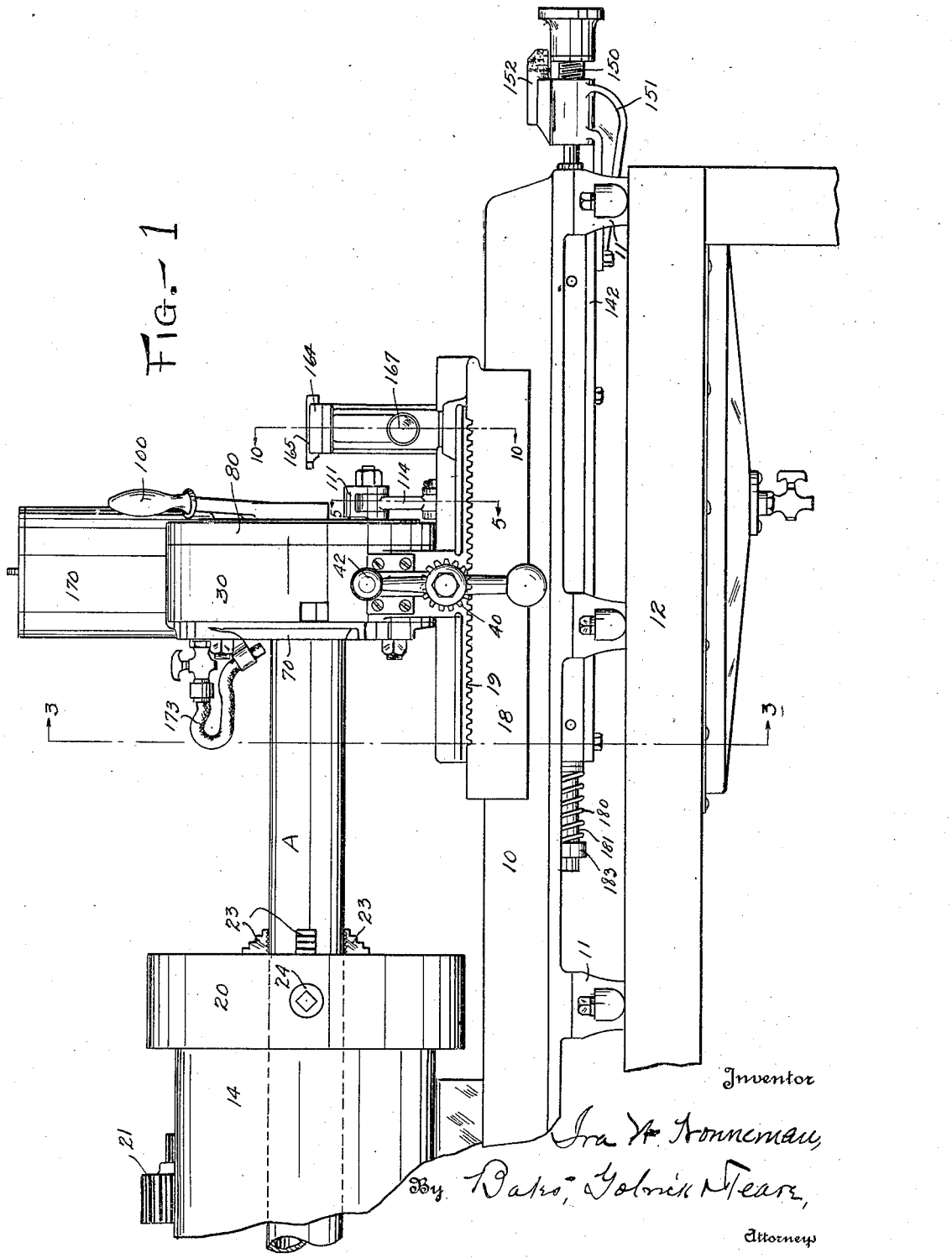

May 24, 1932.                I. W. NONNEMAN                1,859,882
                          PIPE THREADING MACHINE
                    Filed June 6, 1929        5 Sheets-Sheet 2

Inventor
Ira W. Nonneman,
By Bates, Golrick & Fean,
Attorneys

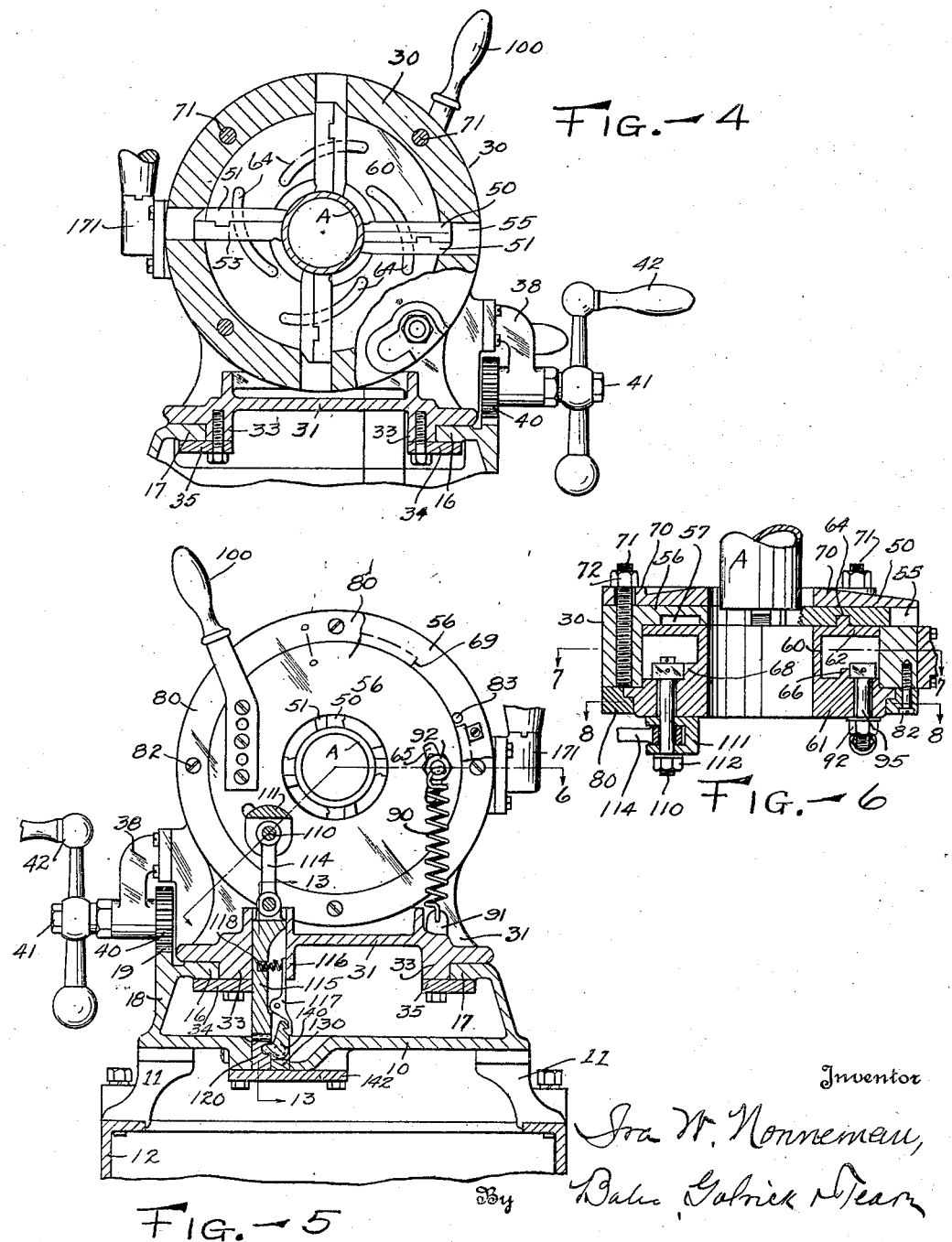

May 24, 1932.  I. W. NONNEMAN  1,859,882
PIPE THREADING MACHINE
Filed June 6, 1929   5 Sheets-Sheet 4
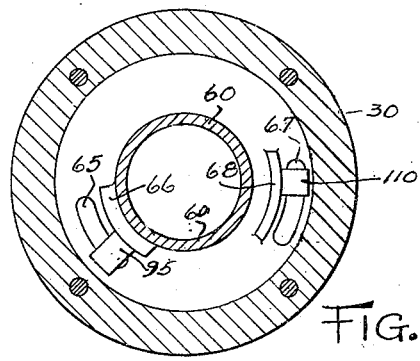
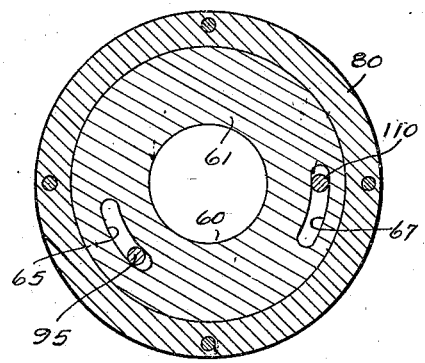
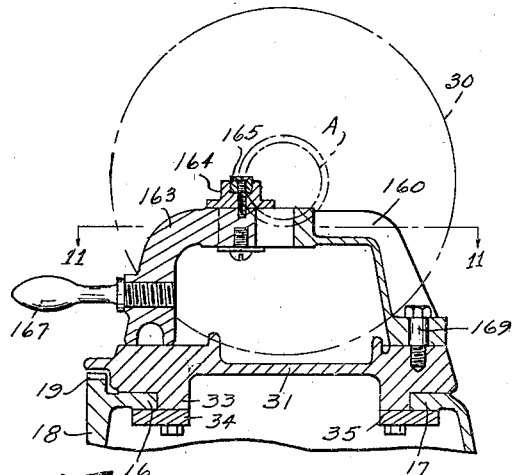
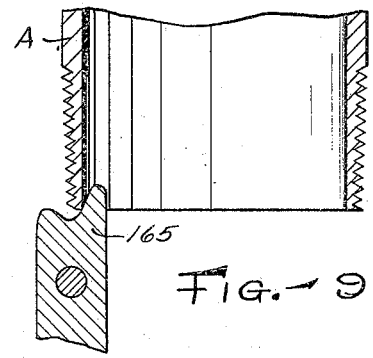
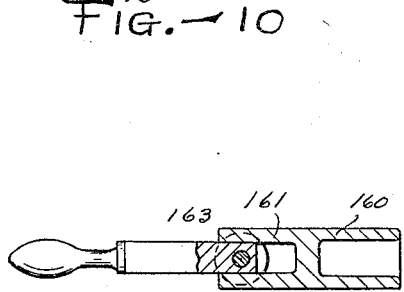
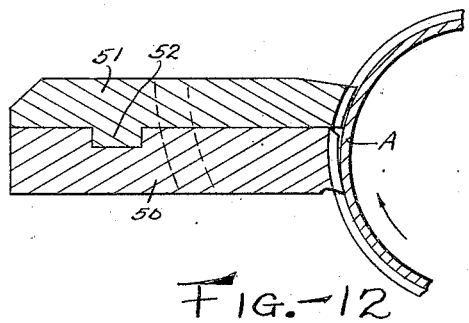
Inventor
Ira W. Nonneman,
By Bates, Goldrick & Teare,
Attorneys

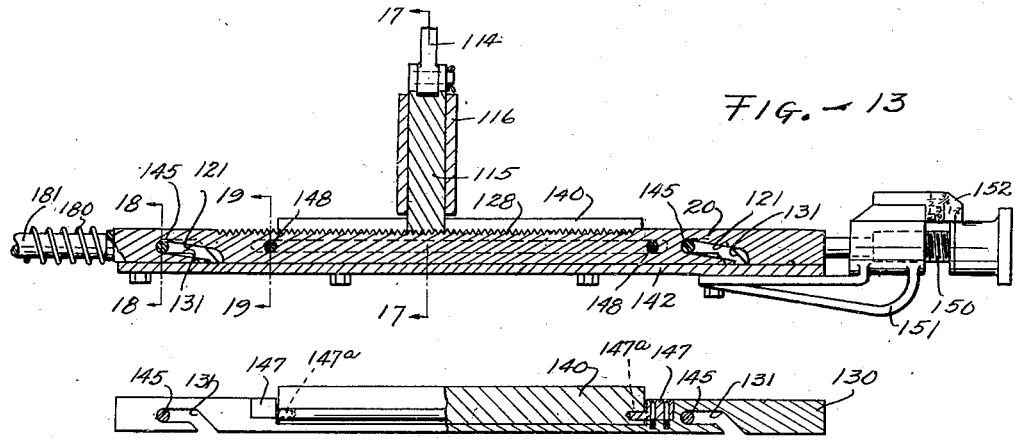
FIG.-13
FIG.-14
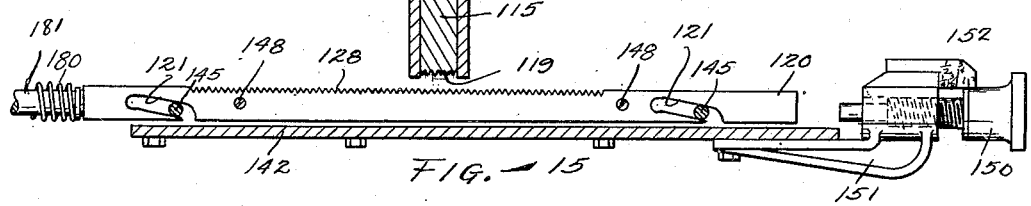
FIG.-15
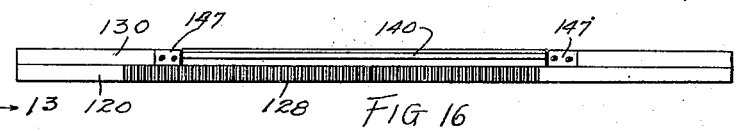
FIG 16
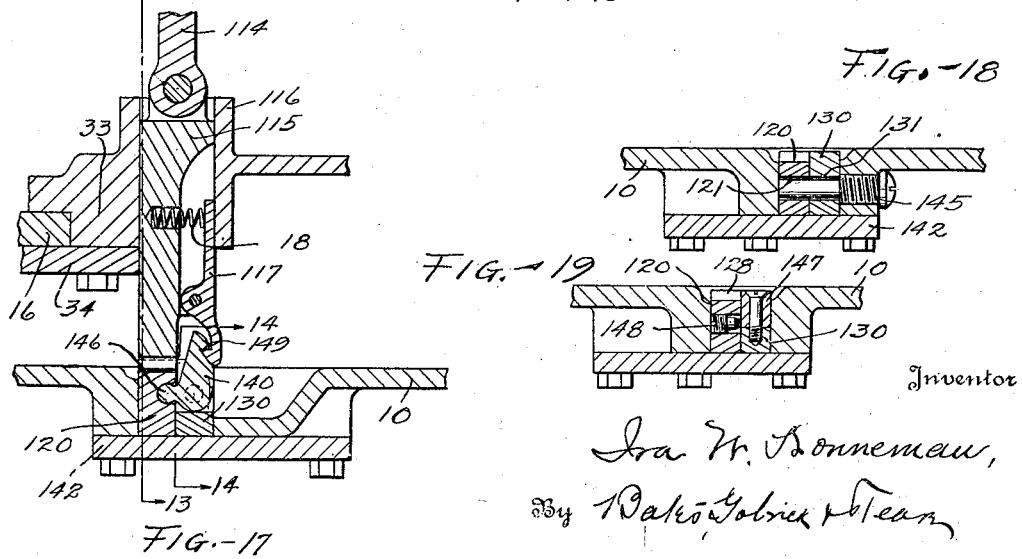
FIG.-17
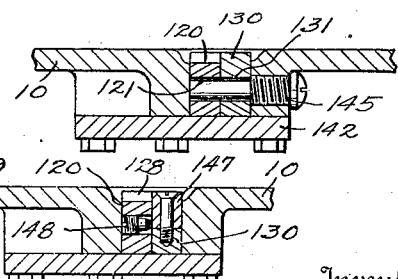
FIG.-18
FIG.-19

Patented May 24, 1932

1,859,882

UNITED STATES PATENT OFFICE

IRA W. NONNEMAN, OF WARREN, OHIO, ASSIGNOR TO THE BORDEN COMPANY, OF WARREN, OHIO, A CORPORATION OF OHIO

PIPE THREADING MACHINE

Application filed June 6, 1929. Serial No. 368,812.

This invention relates to a power driven machine for cutting threads on pipe. One of the objects is to provide such a machine with means for automatically receding the thread-cutting chasers so that a tapered thread may be cut by chasers of materially less face-length than the length of the pipe portion to be threaded. This greatly reduces the power required to operate the machine.

Another object of the invention is to enable the thread being cut to furnish of itself the lead screw for the machine. This increases the adaptability of the machine and materially reduces the cost of construction, since the employment of fixed lead screws would require a different screw for each pitch, whereas by enabling the thread to determine the pitch it is simply necessary to provide different chasers within the range of the machine. Likewise, if the machine is to cut left hand threads, a double set of lead screws would be necessary, but with applicant's invention, it is only required to provide left hand chasers and reverse the motor.

Another feature of applicant's invention is concerned with provisions for enabling the thread to be started with the pipe projecting any convenient distance from the chuck, the cutting head being simply brought up to the pipe. This enables rapid chucking of the pipe.

Another feature of this invention is the automatic drawing back of the chasers at the conclusion of the cutting operation to free the cutting head from the pipe. Thereafter, if desired, the pipe may be withdrawn through the cuting head, instead of being carried back through the chuck. This also, enables a trimming tool to be brought into engagement with the end of the pipe for removing the burr.

My invention comprises mechanism which accomplishes all of the above objects, and has other features of advantage which will be apparent from a detailed description of a preferred embodiment as shown in the drawings and about to be described.

Figure 2:
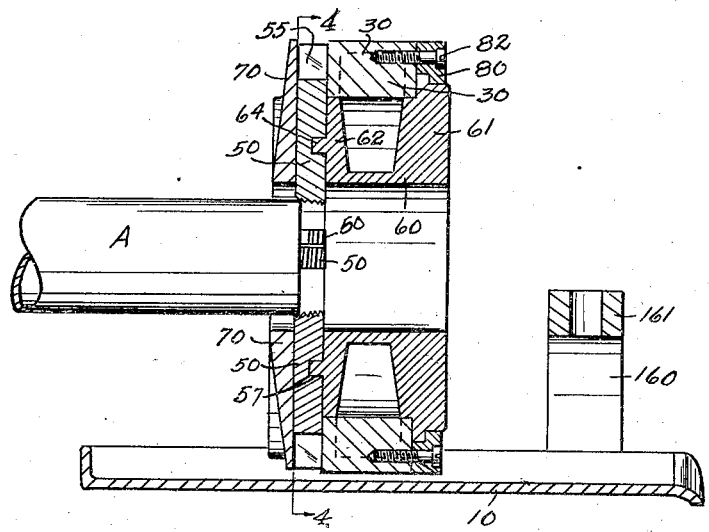
Figure 3:
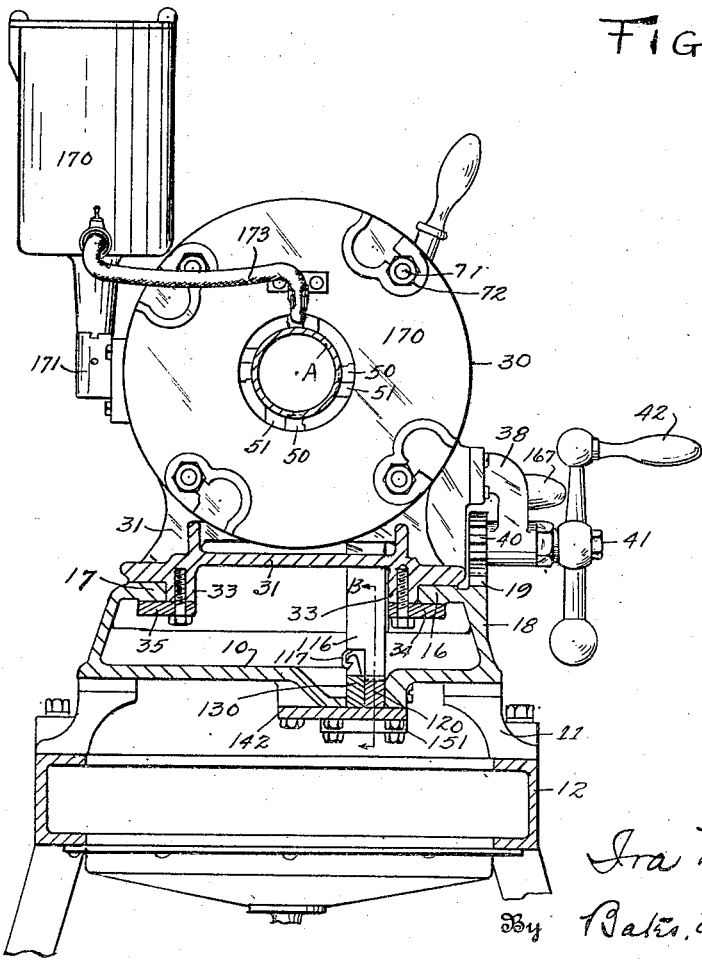

In the drawings, Fig. 1 is a side elevation of a portion of the machine, the left hand part of the frame being broken away, and the gearing for rotating the chuck being simply indicated; Fig. 2 is a vertical longitudinal section through the cutter head and a portion of a pipe positioned for starting the threading; Fig. 3 is a vertical cross-section substantially on the line 3—3 of Fig. 1 looking toward the cutter head; Fig. 4 is a section on the same plane as Fig. 3 with the face plate of the cutter head removed; Fig. 5 is a vertical section looking in the opposite direction to Figs. 3 and 4, the plane of this section being indicated by the line 5—5 of Fig. 1; Fig. 6 is a section through the cutter head on two radiating planes, as indicated by the line 6—6 on Fig. 5; Figs. 7 and 8 are transverse sections through the cutter head, as indicated by the lines 7—7 and 8—8 on Fig. 6; Fig. 9 is a detail in horizontal section through the burr-trimming knife and a pipe with which it cooperates; Fig. 10 is a vertical section through the trimming mechanism, as indicated by the line 10—10 on Fig. 1; Fig. 11 is a detail of the trimming mechanism in horizontal section, as indicated by the line 11—11 on Fig. 10; Fig. 12 is a detail in vertical section showing a cutting chaser backed up by a feeding chaser both in cooperation with the pipe. The remaining figures relate to the mechanism for controlling the recession of the chasers; Fig. 13 is a vertical section on the line 13—13 on Fig. 5 showing the front member of two controlling bars and its cooperating parts; Fig. 14 is a vertical section of a bar at the rear of the bar of Fig. 13; Fig. 15 is a sectional side elevation of the parts shown in Fig. 13 but in different position; Fig. 16 is a plan of the two bars; Fig. 17 is an enlarged vertical section through the two bars and the mechanism to which they are locked, as indicated by the line 17—17 on Fig. 13; Figs. 18 and 19 are details on the same scale as Fig. 17 being vertical sections on the correspondingly numbered lines on Fig. 13.

As shown in Fig. 1, the frame of the machine includes a horizontal bed 10, which is shown as secured by its legs 11 to a suitable supporting bench 12 on which the frame rests. This frame carries a housing 14 in which is journalled a suitable chuck 20 for holding and rotating the pipe. The chuck may be in the nature of a bushing and may carry a suitable gear 21 by which it is rotated by means not shown. The chuck has suitable radial jaws 23 adapted to be set by radiating screws 24 to clamp a pipe indicated at A. It is to be understood the parts just described may be of any suitable form, the object being to provide ready means for clamping and rotating a pipe to be threaded.

The thread cutting members are carried in a head which is mounted in an annular frame 30. This frame has a depending portion 31 which slidably rests on the bed 10. As indicated in Figs. 3, 4 and 5, the bed has a pair of inwardly projecting flattened portions 16 and 17 which form guides and the base of the cutter head rests on these guides, has downwardly projecting ribs 32 and 33 inside of the guides and suitable gibs 34 and 35 projecting beneath the guides. The chaser frame is thus slidably mounted on the main frame.

The main frame 10 is formed with a vertical web 18 (Fig. 5) in front of the horizontal web 16. Along the upper edge of this vertical web are formed rack teeth 19. The cutter frame carries a pinion meshing with this rack. This pinion is shown at 40 mounted on the rear end of a short shaft 41 journalled in a bracket 38 on the forward side of the cutter frame. On this shaft is a suitable feeding crank 42. The rotation of this crank causes the cutter frame to travel in one direction or the other as desired.

The chasers comprise preferably a cutting member 50 having teeth with clearance at its cutting end as shown in Fig. 12, backed up by a feeding member 51 which engages the same thread but has a non-cutting end and preferably no clearance. These two members are secured together as by means of a rib 52 on the feeding chaser engaging a recess in the cutting chaser. The two parts act as a unit in operation and may if desired be made of a single piece of metal. Claims on this cutting and feeding chaser will be found in my application No. 368,811, filed June 6th, 1929.

Each combined chaser 50, 51 is mounted in a radial groove in the cutter frame 30. The ringlike portion of this frame has an inwardly projecting flange 56 at this end which is cut through by notches 55, thus leaving inwardly projecting frame segments which guide the chasers. The inner sides of the chasers lie against a rotary scroll cam journalled within the ring portion of the frame 30 and abutting the inner face of the segments 56.

The cam controlling the chasers is designated 60; it has a central sleeve portion, at the opposite ends of which are outwardly extending annular webs 61 and 62. The web 62 carries scroll ribs (four in number as shown) designated 64, which project freely into recesses 57 in the inner faces of the frame segments 56 and slidably occupy notches in the inner faces of the combined chasers. This causes the chasers to be moved in and out when the cam is moved angularly with reference to the frame. The chasers are held in place by means of a cap plate 70 secured to the frame 30 by suitable studs 71 and nuts 72. The scroll cam 60 is rotatably held in place in the cutter frame by a ring 80 which has a rabbeted edge overlapping the cam as shown in Fig. 6, and is secured by screws 82 to the cutter frame.

In my machine the cam 60 not only may be set for different chasers and different sizes of pipe to properly start the cutting operation, but this cam is gradually rotated during the operation to withdraw the chasers from the pipe, and then, at the end of the cutting operation, is given a further movement to move the chasers back to idle position, thus entirely freeing the pipe. This freedom enables the whole cutter frame to be advanced clear over the pipe if desired to enable the end of the pipe to be trimmed as hereinafter explained, or if desired to enable the pipe to be removed through the cutter head.

A suitable spring is connected with the scroll cam in such manner that it tends to turn the cam in the direction to recede the chasers. Such spring may be of any suitable form and connected directly or indirectly. It is illustrated in Fig. 5 as a tension spring 90 anchored at its lower end to an ear 91 rising from the chaser frame web 31 and connected at its upper end to a bolt 92 attached to the cam. This bolt is shown as adjustable by reason of passing through a slot 65 in the cam. The bolt may have a square head bearing against a rib 66 on the cam to prevent the bolt turning, and it may be clamped by a nut 95.

A suitable handle 100 attached to the cam plate furnishes means for turning it in opposition to the spring. Suitable stops are provided, limiting the rotation of the cam in either direction, as for instance a notch 69 in the rabbeted edge of the cam coacting with a projection on the ring 80 as indicated in broken lines at 83 in Fig. 5.

I will now describe the mechanism for locking the cam with the chasers in active position after the cam has been moved by the handle 100, and for gradually receding such chasers during the cutting operation, this mechanism being best illustrated in Figs. 5 and 13 to 19 inclusive.

Adjustably secured to the cam is a bolt 110 shown as extending through a slot 67 in the cam and having its square head bearing against an arcuate rib 68 on the cam (Fig. 7). Externally of the cam, this bolt passes through a stirrup 111 clamped to the cam by a nut 112. Pivotally journalled on the bolt 110 within the stirrup is a link 114, the lower end of which is attached to a vertical slide 115 in a suitable housing 116 carried by the slide portion 33 of the chaser frame. This slide 115 is adapted to coact with two bars 120 and 130 directly beneath it and carried by the bed 10. The slide 115 carries a hook 117 constrained by a spring 118 and adapted to engage in a suitable latch 140 connected to both bars. It will be seen therefore that when the handle 100 has been operated in the contra-clockwise direction in Fig. 5 to force the chasers inwardly and to stretch the spring 90, the parts may become automatically locked in that position by reason of the engagement of the hook and latch.

Referring now to Figs. 5 and 13 to 19, it will be seen that the bars 120 and 130 lie side by side in a longitudinal recess in the bed plate 10 resting on a supporting plate 142. These two bars are held against upward movement, except as hereinafter described, by pins 145 screwing through the wall of the bed at one side of the recess and occupying slots 121 and 131 in the bars. These slots extend lengthwise of the bars and enable them to move longitudinally of the frame. They also incline slightly upwardly enabling the bars to rise as they move longitudinally as hereinafter explained. The two bars are coupled together by means of the latch bar 140 which is in the form of a bell crank in cross section and is journalled on the bar 130 and has a wing 146 engaging in a slot in the bar 120, the limit of the slot being defined by pins 148. The journalling of the latch bar may be effected by bearing blocks 147 secured to the bar 130 and having pins 147a entering cavities in the ends of the latch bar. The bar 120 has teeth 128 on its upper edge which coact with teeth 119 formed on the lower edge of the slide 115.

When the slide 115 is forced downwardly by the operation of the handle 100, not only does the hook 117 engage a horizontal groove 149 in the side of the latch bar 140 but the teeth 119 engage the teeth 128 of the bar 120 so that these parts are locked together.

Now, as the threading begins, the reaction of the thread on the chasers pulls the chaser frame along the pipe and this, by reason of the engagement of the teeth 119 and 128 moves the bar 120 which by reason of its connection with the bar 130, moves the latter bar also longitudinally. As heretofore stated, the slots 121 and 131 in these bars are not horizontal, but inclined upwardly. Accordingly, as the chaser frame travels, the bars rise gradually. This rising movement is accompanied by a corresponding rising movement of the slide 115, which thereby rocks the scroll cam backwardly to recede the chasers. Accordingly, as the threading progresses, the chasers gradually recede and the desired taper thread is cut.

As the operation of threading is about concluded, considerably steeper portions of the slots 131 come against the pins 145 and give the bar 130 a sudden upward movement which rocks the latch bar 140 out of engagement with the hook 117, which by reason of the engagement of its upward extension with the housing 116 cannot follow such movement. The slide 115 is thus freed, and the spring 90 thereupon turns the cam to carry the chasers to their outermost position, thus entirely freeing the chasers from the pipe. This movement of the slide 115 also carries the teeth 119 free from the bar 120 and leaves the cutter frame free for longitudintal movement without regard to the bar 120. The cutter frame may now be moved as desired by rotation of the crank 42. When the teeth 119 are free from the bar 120 a compression spring 180 mounted on a bar 181 which is slidably mounted in the depending lugs 183 of the frame 10, returns the bars 120 and 130 to their normal position against the adjusting screw 150.

In order to vary the length of the thread cut, I provide an adjustable abutment for the bars 120 and 130. This is shown as comprising a screw 150 which is mounted in a bracket 151 carried by the frame plate 142. The farther this screw is turned in, the farther toward the left (Figs. 13 and 15) will be the beginning of the operation of the bars 120 and 130 and hence the sooner will the recession of the chasers be completed and the shorter the thread cut.

A suitable mark on the head of the screw 150 may cooperate with a graduated scale 152 marked for different sizes of pipe, so that a simple setting of this screw until the corresponding marks are in registration is all that is necessary to select the length of the thread. Preferably, one position is proper for pipes of ¼″ and ⅜″ size, and another position for pipes of ½″ and ¾″ size, and a third position for pipes from 1″ to 2″ in size.

The change of chasers for different sizes of pipe is readily effected by simply loosening the nuts 72; giving the face plate 70 a slight turn from the position of Fig. 3 to that fragmentarily indicated in Fig. 4; removing the face plate, and substituting the desired chasers.

A threading operation frequently leaves a burr on the inner face of the pipe end, and it is desirable to remove this burr to prevent reducing the bore of the pipe. My machine enables this to be very readily effected, since, when the chasers are thrown back, the whole head may be carried over the pipe, leaving the end of the pipe free on the far side of the chaser head without changing the chucking of the pipe.

Moreover, it is one of the features of my invention that I may carry a trimming tool by the chaser frame so that it may be brought into the region of the pipe end by the operation of the crank 42. This feature is illustrated in Figs. 1, 9, 10 and 11. Pivoted to the base portions 31 of the chaser frame, as by a screw 169, is a bracket 160 having a bifurcated front portion 161. Into this bifurcation extends a slidable member 163 carrying a block 164 in which a trimming knife 165 is mounted. The member 163 carries a handle 167 by which it may be shoved forward or backward and by which this whole frame may be swung about the pivot 169.

After the chasers have been receded and the cutter frame moved toward the left (Fig. 1) by the operation of the crank 42, the trimming knife 165 may be brought into position to engage the inner edge of the pipe by movement of the handle 167, the knife thus engaging the pipe as shown in Fig. 9 and operating to trim off the burr. As the pipe is rotating, this trimming is very readily effected by the operator simply drawing on the handle 167 and pressing toward the pipe with sufficient force to maintain the knife in engagement with the burr until it is entirely trimmed off. When not in use the trimming device may be turned backward on its pivot out of the way, enabling the removal of the pipe through the cutter head, as heretofore mentioned.

Figs. 1 and 2 show an oil container 170 supported by a bracket 171 on the cutter frame 30 and discharging through a suitable conduit 173 onto the pipe in the vicinity of the cutter.

It will be appreciated, from the description given, that my machine is simple and comparatively inexpensive in construction; that it enables the thread to be started with the pipe projecting any convenient distance from the chuck, the cutting head being simply brought up to it; that the pipe may be trimmed without rechucking, and that the pipe may be withdrawn through the cutter head as the chasers are carried back clear of contact with the pipe. All of these features are associated together in a machine which has the great advantage of automatically receding chasers, whereby the power consumption is materially reduced.

I claim:—

1. The combination with means for holding a pipe to be threaded, a frame adjustable lengthwise of the pipe, chasers carried by the frame, the thread cut thereby on the pipe acting as a feed screw for moving said frame lengthwise of the pipe, separable mechanism mounted in part on the frame and in part independently thereof for causing recession of the chasers, and means for locking the two parts of said mechanism together at various positions of the frame.

2. The combination of a rotary chuck, a longitudinally movable head, chasers carried by said head, a cam carried by the head for controlling the radial position of the chasers, mechanism for positioning the head with reference to the article to be cut, a device separable from and carried independently of the head for controlling the turning of the cam, and a latch for locking the head thereto in various positions of the head.

3. The combination of a rotary chuck, an axially movable head, chasers carried by said head, a stationary rack, a pinion carried by the head and engaging the rack for shifting the head axially of the chuck, means carried by the head for controlling the radial position of the chasers, and mechanism separable from and supported independently of the head to which the head may be connected in various positions for operating said controlling means, and means for disconnecting the mechanism at the conclusion of the threading operation.

4. The combination of a rotary chuck, a longitudinally movable frame, chasers carried thereby, a cam carried by the frame controlling the position of the chasers, longitudinally and transversely movable means carried by the machine independently of the chaser frame, means for establishing a connection which is separable between the cam and said longitudinally and transversely movable means and means whereby the transverse movement of the longitudinally and transversely movable means may actuate the cam to recede the chasers during the progress of cutting the thread.

5. In a machine of the character described, the combination of a bed, a chaser-carrying frame slidably mounted thereon, a longitudinally movable bar carried by the bed, a cam carried by the chaser-carrying frame for controlling the position of the chasers, means for anchoring the cam at various positions on the bar, and means for causing the bar to move both longitudinally and transversely during the cutting of the thread, said transverse movement operating the cam to recede the chasers.

6. In a machine of the character described, the combination of a rotary pipe holding chuck, a bed, a chaser carrying frame slidably mounted on the bed in a direction axially of the chuck, a rotary scroll cam on the chaser frame for controlling the position of the chasers, a longitudinally movable bar carried by the bed, means for anchoring the cam to the bar in various positions of the chaser frame, whereby the bar may move longitudinally with the chaser frame as the thread is cut, and means consequent upon the longitudinal movement of the bar for moving it transversely to cause turning of the cam to recede the chasers.

7. In a machine of the character described, the combination of a movable head, radial chasers mounted therein, a cam for controlling the chasers, mechanism supported independently of the head to which the cam may be latched, means whereby said mechanism changes the position of the cam as the threading progresses, means for automatically unlatching the cam from said mechanism at the conclusion of the threading, and means acting on the cam to throw the chasers to idle position when the cam becomes unlatched.

8. In a machine of the character described, the combination of a movable head, radial chasers mounted therein, a rotary cam for controlling the chasers, a slide connected to the cam, longitudinally movable mechanism to which the slide may be latched, means whereby said mechanism changes the position of the cam as the threading progresses, and means for automatically unlatching the slide from the mechanism at the conclusion of the threading.

9. The combination of a longitudinally movable head, radial chasers carried thereby, a scroll cam carried by the head and controlling the chasers, spring means tending to turn the cam to recede the chasers to idle position, separable mechanism supported independently of the head to which the cam may be latched at various positions to hold the chasers in an active position, means for moving said mechanism while maintaining the latched connection to cause the chasers to gradually recede during the threading operation.

10. The combination of a sliding head, means for positioning it as desired, a set of chasers carried by the head, a cam carried by the head for positioning the chasers, a member carried by the head connected with the cam, a longitudinally movable bar carried by the frame of the machine independently of the head, means for latching said member to the bar whereby the movement of the head during the threading moves the bar longitudinally and means whereby such longitudinal movement of the bar is automatically accompanied by a transverse movement which acting on said member causes a partial rotation of the cam to recede the chasers.

11. In a machine of the character described, the combination of a slidable head, radial chasers carried thereby, a rotary cam for controlling the chasers, a pair of bars mounted independently of the head, said bars being side by side and connected together for longitudinal movement, but one being movable transversely with reference to the other, means for connecting the cam to said bars to maintain the chasers in a cutting position, the travel of the head moving the bars longitudinally, and means whereby such longitudinal movement of the bars results in one of the bars moving transversely with reference to the other, said transverse movement causing the unlatching of the cam.

12. The combination of a sliding head, means for positioning it as desired, a set of chasers carried by the head, mechanism carried by the head for positioning the chasers, a movable member carried by the frame of the machine independently of the head, means for latching said mechanism to said member whereby the movement of the head during the threading moves said member, and means whereby such movement of the member is accompanied by a transverse movement, which, acting on said mechanism causes a recession of the chasers.

13. A machine of the character described, the combination of a slidable head, chasers carried thereby, means on the head for controlling the chasers, a pair of movable members mounted independently of the head side by side and connected together for movement in one direction but one movable transversely with reference to the other, means for connecting the chaser operating mechanism to said members to normally maintain them in an operative position and to cause the travel of the head to move both of said members, and means whereby said movement of the two members results in one of them moving transversely with reference to the other, said transverse movement causing the disconnection of the chaser operating mechanism.

14. In a machine of the type described, the combination of a movable head, radial chasers mounted therein, a rotary cam for controlling the chasers, a slide connected to the cam, said slide being provided with a toothed portion and a latch, and means supported independently of the head for controlling said slide, said means comprising a toothed bar and a latch bar, whereby said slide may be connected to said controlling means at various positions.

15. In a machine of the type described, the combination of a movable head, chasers mounted therein, means for positioning said chasers including a slide mounted on the head and having a toothed portion and a latch, a toothed bar and a latch bar supported independently of the head and adapted to be latched to the slide at various positions whereby movement of the head will cause longitudinal movement of both members, and means whereby said longitudinal movement of the bars results in one of them moving transversely with reference to the other, said relative transverse movement causing the slide to be disconnected from the bars.

16. The combination of means for holding a pipe, means for holding a chaser, mechanism for rotating one of said holding means with reference to the other, means whereby one of the holding means may move axially of the pipe during the cutting of the thread, and separable mechanism mounted in part on the pipe-holding means and in part on the chaser-holding means for receding the chaser during such cutting of the thread including a longitudinally movable part to which the axially movable holding means may be locked in various positions of such holding means.

In testimony whereof, I hereunto affix my signature.

IRA W. NONNEMAN.